United States Patent [19]

McCaulay et al.

[11] 4,035,286

[45] July 12, 1977

[54] OCTANE UPGRADING OF LIGHT NAPHTHA STREAMS USING A FLUOROALKANESULFONIC ACID-ANTIMONY PENTAFLUORIDE MIXTURE

[75] Inventors: David A. McCaulay, Homewood, Ill.; Thomas D. Nevitt, Valparaiso, Ind.

[73] Assignee: Standard Oil Company (Indiana), Chicago, Ill.

[21] Appl. No.: 316,860

[22] Filed: Dec. 20, 1972

[51] Int. Cl.[2] ........................................ C10G 35/06
[52] U.S. Cl. .......................... 208/134; 260/683.68
[58] Field of Search ............... 208/134; 260/683.68

[56] References Cited

U.S. PATENT DOCUMENTS

| | | | |
|---|---|---|---|
| 3,594,445 | 7/1971 | Parker | 260/683.68 |
| 3,636,129 | 1/1972 | Parker | 260/683.47 |
| 3,678,120 | 7/1972 | Bloch | 260/668 A |
| 3,708,553 | 1/1973 | Olah | 260/683.47 |
| 3,766,286 | 10/1973 | Olah | 260/668 A |

Primary Examiner—Delbert E. Gantz
Assistant Examiner—James W. Hellwege
Attorney, Agent, or Firm—William H. Magidson; Arthur G. Gilkes; William T. McClain

[57] ABSTRACT

Catalyst and process for octane upgrading of light naphtha feed by using a fluoroalkanesulfonic acid-antimony pentafluoride mixture as a conversion catalyst.

6 Claims, 3 Drawing Figures

OCTANE UPGRADING OF LIGHT NAPHTHA STREAMS USING A FLUOROALKANESULFONIC ACID-ANTIMONY PENTAFLUORIDE MIXTURE

SUMMARY OF THE INVENTION

This invention relates to a novel catalyst and process for converting a light naphtha feed into a mixture of higher octane hydrocarbons and, more particularly, it relates to a fluoroalkanesulfonic acid-antimony pentafluoride catalyst for the conversion of pentanes, hexanes or mixtures thereof and its use in processes for the octane upgrading of light naphtha feeds.

In accordance with the instant invention a light naphtha feed composed primarily of pentanes, hexanes or mixtures thereof is contacted, preferably after desulfurization, drying and dearomatizing of the feed to improve catalyst lifetime, in a continuous or batch process with a mixture of antimony pentafluoride and a fluorine substituted alkanesulfonic acid to convert said feed into a stream containing a mixture of hydrocarbons having a substantially higher octane number.

BACKGROUND OF THE INVENTION

Light naphtha stream conversion to higher octane mixtures is an important part of the oil refining process and has been accomplished by a number of different catalysts in the past including such materials as mixtures of fluorosulfonic acid and antimony pentafluoride which are called in the art, "super-acid" catalysts. However, such catalysts have a relatively short life. Now it has been found that by replacing the fluorosulfonic acid by a plurality fluorine-substituted alkanesulfonic acid having a perfluoromethylene group adjacent to the functional group or a perfluoroalkanesulfonic acid, a conversion catalyst of substantially longer life can be obtained which is capable of effecting the usual octane upgrading processes such as alkylation, isomerization and cracking when in contact with hydrocarbons under the appropriate temperature, pressure and concentration conditions.

STATEMENT OF THE INVENTION

Figure 1:
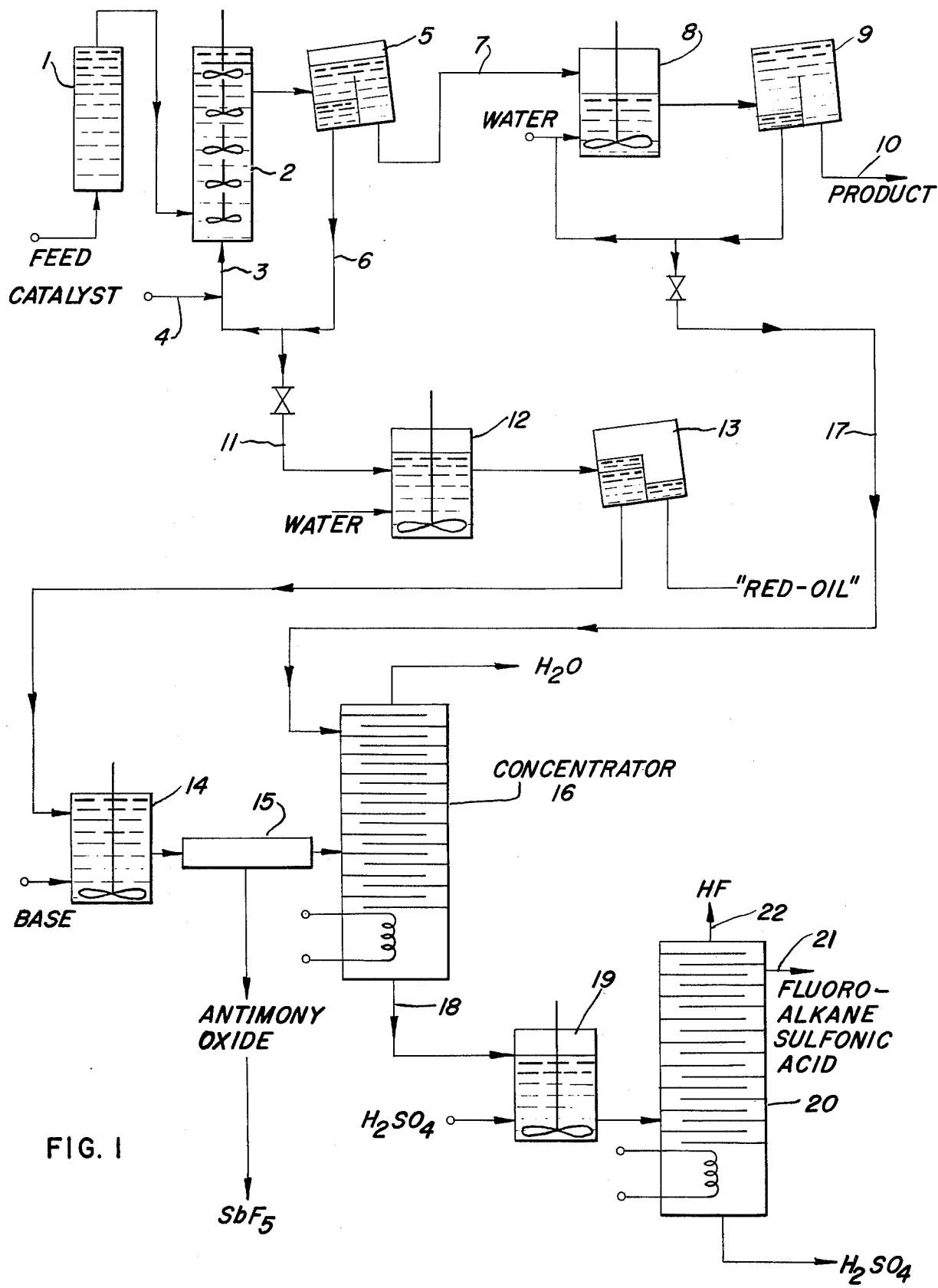
FIG. 1 shows one embodiment of the instant invention whereby a light naphtha feed is converted to a higher octane hydrocarbon mixture and the conversion catalyst is continually recycled and regenerated.

In the embodiment of the process as illustrated in FIG. 1, a light naphtha feed, preferably dried and desulfurized, comprised of pentanes and/or hexanes is passed into dearomatizer 1 (dearomatization is accomplished preferably either by catalytic hydrogenation or by adsorption on 13x molecular sieves) and into reactor 2. The feed preferably contains from about 2 to about 30 weight percent and, more preferably, from about 5 to about 15 weight percent methylcyclopentane or cyclohexane or another inhibitor to prevent "run-away" cracking. Run-away cracking involves the production of isobutane and a highly unsaturated material "red-oil" and its inhibition is well-known in the art.

In reactor 2 the feed is intimately contacted with the catalyst entering via line 3. Reactor 2 temperature is kept between about −5° F. and about 60° F., more preferably, between about 10° F. and about 50° F. and, most preferably, between about 20° F. and about 40° F.

Make-up catalyst enters through line 4 and consists of a mixture of about 0.1 to about 2.0 volumes, more preferably, about 0.4 to about 1.6 volumes and, most preferably, about 0.6 to about 1.2 volumes of antimony pentafluoride to one volume of the fluoroalkanesulfonic acid used.

Space velocities are important for achieving maximum octane upgrading in a continuous process using the instant invention and they depend upon reactor 2 temperature. A lower space velocity will of course be used at a lower reaction temperature. It has been found that at about 60° F. space velocities between about 1.6 to about 4.0 volumes of feed per volume of antimony pentafluoride per hour are useful. At about −5° F. a space velocity between about 0.05 to about 0.13 volumes of feed per volume of antimony pentafluoride per hour is used at about 32° F. the space velocity should be about 0.8 to about 2.0 volumes of feed per volume of antimony pentafluoride per hour.

The reactor effluent is passed into settler 5 where the heavier catalyst phase separates as a bottom layer and is recycled to reactor 2 via line 6. The upper hydrocarbon phase is removed from this settler through line 7 into stirred washer 8 where it is mixed with water to remove the small amounts of dissolved and entrained fluoroalkanesulfonic acid. The mixture is sent to settler 9 and the upper hydrocarbon layer is taken off at line 10. The lower aqueous phase is recycled to mixer 8.

As the catalyst ages it gradually loses some of its activity due to the formation of a polyunsaturated red-oil by-product, which acts as a base in this strong acid system. Under optimum operating conditions about 0.01 weight percent or less of the hydrocarbon feed is converted to red-oil. Therefore it is necessary to remove a small slip-stream of the circulating catalyst through line 11 and replace it by make-up catalyst added through line 4. The catalyst removed via line 11 is passed into stirred vessel 12 where it is mixed with about 4 or 5 times its volume of water. The catalyst components dissolve in the water layer while the red-oil separates as a separate phase. The mixture is sent to settler 13 where the upper red-oil layer is separated off. The aqueous phase is passed into mixer 14 where it is neutralized with ammonia or another suitable base. Upon neutralization, antimony oxide precipitates out and the slurry is sent to zone 15 where the antimony oxide is recovered by, for example, filtration or centrifuging. The oxide may then be converted to the pentafluoride by appropriate means and the pentafluoride is recycled to the system.

The filtrate, which is an aqueous solution of an ammonium fluoroalkanesulfonate, if ammonia is used, is sent to tower 16, along with a stream of aqueous fluoroalkanesulfonic acid coming via line 17 from the hydrocarbon washing zone. In tower 16 most of water is distilled overhead. The concentrated bottom product is then taken through line 18 into vessel 19 where it is mixed with 96–100 percent sulfuric acid. This solution is then distilled in tower 20. The fluoroalkanesulfonic acid comes off through line 21 and is recycled to the isomerization reactor. Hydrogen fluoride, coming from the hydrolysis of antimony pentafluoride in vessels 12 and 14, distills overhead through line 22 and can be used in the step in which antimony oxide is converted back to the pentafluoride.

The Example presents the results of experiments in which batches of hydrocarbon were stirred with batches of catalyst under the specified conditions. Run 1 was made with trifluoromethanesulfonic acid alone at ambient temperature. After more than 9 months stirring, the hexane fraction contained only 23 weight percent neohexane. Also, the reaction is unselective as it was accompanied by 9.5 weight percent disproportionation to lighter and heavier stocks. But in Run 2, in which antimony pentafluoride is used along with trifluoromethanesulfonic acid, the isomerization rate is more than 20,000 times faster. Near-equilibrium is reached in 2 hours. An excess of methylcyclopentane was used in this run to avoid run-away cracking.

In other runs of the Example lower temperatures are seen to make the rate progressively slower, but less methylcyclopentane is needed to control cracking and the equilibrium concentration of neohexane is higher. Run 6 was made with much less antimony pentafluoride than used in the other promoted runs and the isomerization rate is much lower showing that activity decreases with a drop-off in antimony pentafluoride concentration.

The effect of temperature on rate is illustrated in the Table below. From 75° F. to 9° F. the rate of isomerization decreases smoothly but below about 9° F. there is a rapid drop-off. Minimum practical operating temperature is therefore about −5° F. where the activity approaches zero rapidly.

TABLE

Effect of Reaction Temperature on the Isomerization Rate Constant

| Reaction Temperature ° F. | Isomerization Rate Constant* |
|---|---|
| 75 | 0.65 |
| 32 | 0.16 |
| 9 | 0.06 |
| −4 | 0.016 |

*See Example for definition.

Figure 2:
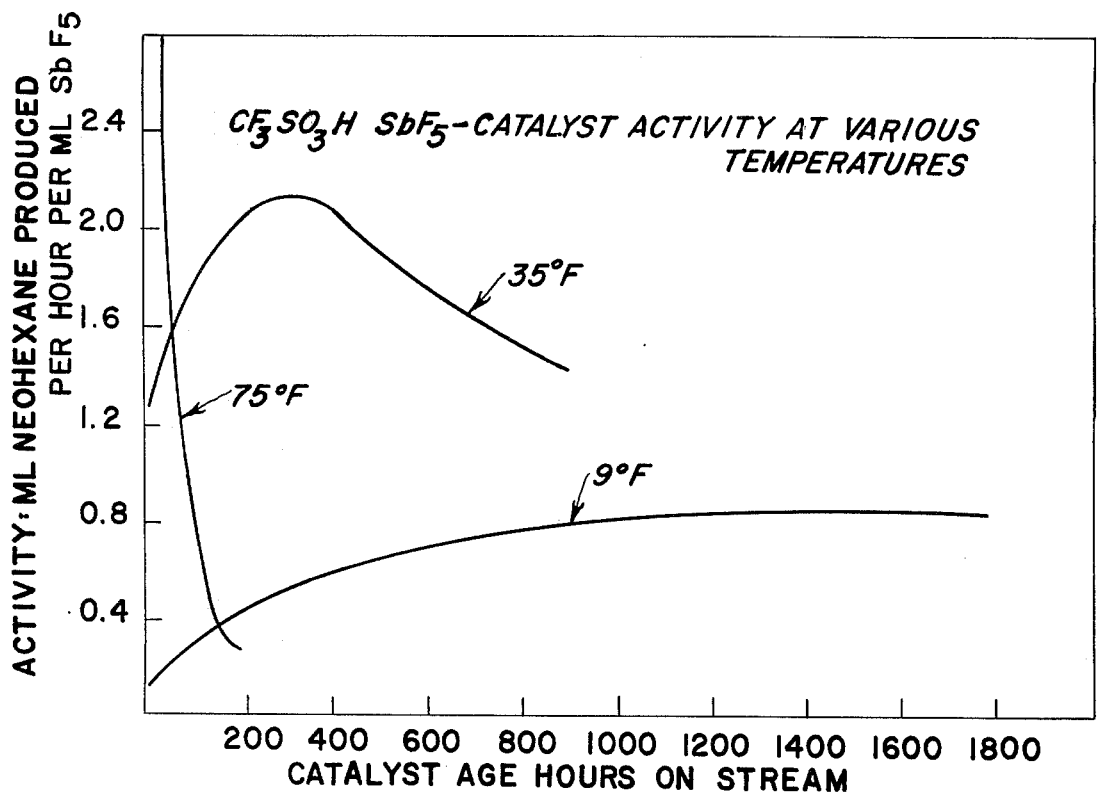
FIG. 2 shows catalyst activity as a function of the time "on stream" in contact with hydrocarbon.

The maximum operating temperature is set by factors that control catalyst deactivation. Because antimony pentafluoride is expensive and is difficult to recover and regenerate from spent catalyst, the catalyst must have high activity over a long time period. FIG. 2 summarizes the results of runs in which catalyst activity was determined as a function of the catalyst age (i.e., the time on-stream in contact with hydrocarbon). Catalyst efficiency (= activity × useful life) is about the same at 9° F. and at 32° F. but at 75° F. it is much lower.

Figure 3:
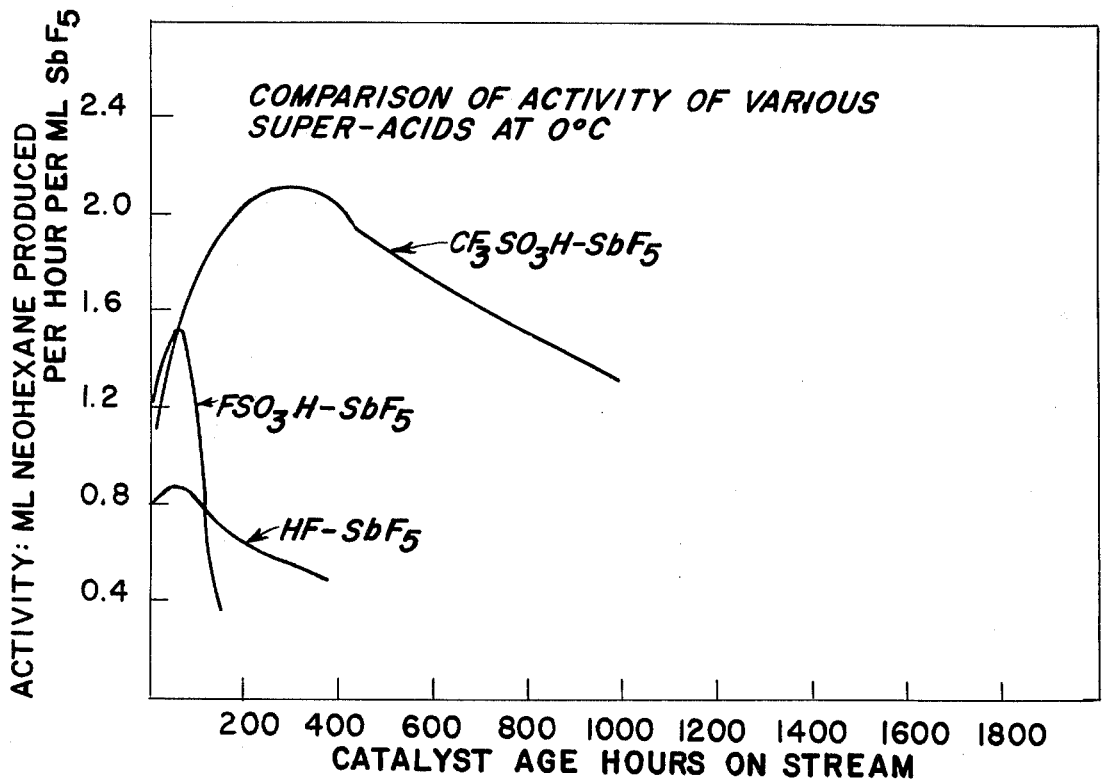
FIG. 3 shows the comparative activity at 0° C. of several super-acid catalysts including one of the catalysts of the instant invention.

In FIG. 3, the activity at 0° C. of a trifluoromethanesulfonic acid-antimony pentafluoride mixture is compared with that shown by other super-acids, a fluorosulfonic acid-antimony pentafluoride mixture and a hydrogen fluoride-antimony pentafluoride mixture. This Figure shows that a trifluoromethanesulfonic acid-antimony pentafluoride mixture has a useful life about 10 times longer than does a fluorosulfonic acid-antimony pentafluoride mixture — which dies after about 180 hours — and is much more active over a much longer time period than is a hydrogen fluoride-antimony pentafluoride mixture.

While the invention is descibed in connection with the specific Examples below, it is to be understood that these are for illustrative purposes only. Many alternatives, modifications and variations will be apparent to those skilled in the art in the light of the below Examples and such alternatives, modifications and variations will fall within the scope and spirit of the appended claims.

GENERAL PROCEDURE

The Example presents the results of six conversions wherein batches of hydrocarbon of various compositions were stirred with varying kinds and amounts of catalyst under the specified conditions. Analysis of the resulting product mixtures was made using vapor phase chromatography according to standard techniques.

EXAMPLE

| Run No. | Isomerization of 2-Methylpentane | | | | | |
|---|---|---|---|---|---|---|
| | 1 | 2 | 3 | 4 | 5 | 6 |
| Hydrocarbon Feed | | | | | | |
| 2-Methylpentane, volume in milliliters | 43 | 87.5 | 150.5 | 150.5 | 175 | 150.5 |
| Methylcyclopentane, volume in milliliters | 7 | 87.5 | 24.5 | 24.5 | 0 | 24.5 |
| Trifluoromethanesulfonic Acid, | | | | | | |
| volume in milliliters | 10 | 40 | 40 | 40 | 40 | 50 |
| Grams | 16.9 | 67 | 67 | 67 | 67 | 83 |
| Antimony Pentafluoride, volume | | | | | | |
| in milliliters | 0.0 | 13 | 13 | 13 | 13 | 4 |
| Grams | 0.0 | 39 | 39 | 39 | 39 | 12 |
| Temperature, ° F. | 75 | 75 | 32 | 9 | −4 | 70.5 |
| Reaction Time, hours | 6700 | 2.0 | 7.6 | 24 | 23.5 | 70.5 |
| Product Composition, Weight Percent | | | | | | |
| Propane | 0.0 | 0.0 | 0.0 | 0.0 | 0.0 | 0.0 |
| Isobutane | 2.2 | 0.3 | 1.0 | 0.2 | 0.1 | 0.8 |
| n-Butane | 0.0 | 0.0 | 0.0 | 0.0 | 0.0 | 0.0 |
| Isopentane | 1.2 | 0.1 | 0.4 | 0.1 | 0.1 | 0.5 |
| n-Pentane | 0.1 | 0.0 | 0.0 | 0.0 | 0.0 | 0.0 |
| 2,2-Dimethylbutane | 18.7 | 23.8 | 43.0 | 50.0 | 29.4 | 26.4 |
| 2,3-Dimethylbutane | 11.4 | 4.3 | 8.0 | 8.2 | 15.7 | 12.1 |
| 2-Methylpentane | 29.8 | 12.8 | 21.9 | 17.6 | 37.7 | 31.8 |
| 3-Methylpentane | 14.1 | 4.7 | 7.1 | 6.1 | 13.1 | 10.7 |
| n-Hexane | 6.1 | 2.2 | 3.2 | 3.0 | 3.1 | 3.4 |
| Methylcyclopentane | 1.3 | 9.6 | 1.6 | 0.5 | 0.0 | 1.2 |
| Cyclohexane | 9.1 | 40.4 | 11.4 | 13.4 | 0.0 | 11.7 |
| Higher | 6.0 | 1.9 | 1.7 | 0.3 | 0.9 | 1.4 |
| Composition of Hexane Fraction | | | | | | |
| 2,2-Dimethylbutane | 23.4 | 49.9 | 52.2 | 58.4 | 29.7 | 31.3 |
| 2,3-Dimethylbutane | 14.2 | 8.9 | 7.5 | 9.6 | 15.9 | 14.3 |
| 2-Methylpentane | 37.2 | 26.7 | 26.0 | 20.6 | 38.1 | 37.6 |

EXAMPLE-continued

| Run No. | Isomerization of 2-Methylpentane | | | 4 | 5 | 6 |
| --- | --- | --- | --- | --- | --- | --- |
|  | 1 | 2 | 3 |  |  |  |
| 3-Methylpentane | 15.6 | 9.9 | 8.4 | 7.9 | 13.2 | 12.7 |
| n-Hexane | 7.6 | 4.6 | 3.8 | 3.5 | 3.1 | 4.1 |
| $K = \left(\dfrac{X_{eq}}{t} \ln \dfrac{X_{eq}}{X_{eq} - X}\right)$ isomerization rate constant | 0.00003 | 0.65 | 0.16 | 0.06 | 0.016 | 0.006 | where,
$X_{eq}$ = Neohexane (2,2-DMB) concentration at equilibrium, (time equal to infinity)
$X$ = Neohexane concentration in product at time t.
$t$ = Reaction time, hours.

What is claimed is:

1. A process for increasing the octane rating of a light naphtha composed primarily of substantially dearomatized $C_5$ or $C_6$ hydrocarbons or a mixture thereof and at least some methylcyclopentane or cyclohexane to reduce run-away cracking comprising:
   a. intimately contacting under isomerizing conditions said light naphtha with antimony pentafluoride and at least one fluoroalkane-sulfonic acid of formula $RCF_2SO_3H$ wherein R = Cl, F, $CF_3$, $CF_2Cl$, $CF_3CFCl$, $C_2F_5$, $C_3F_7$, $CF_2SO_3H$, or $C_4F_9$, and
   b. subsequently separating said mixture of antimony pentafluoride and at least one fluoroalkanesulfonic acid from the product of step (a).

2. The process of claim 1 wherein said fluoroalkanesulfonic acid is trifluoromethanesulfonic acid or perfluoroethanesulfonic acid.

3. A continuous process for increasing the octane rating of a light naphtha composed primarily of substantially dearomatized $C_5$ or $C_6$ hydrocarbons or a mixture thereof comprising:
   a. intimately contacting under isomerizing conditions said light naphtha feed and about 2 to about 30 weight percent of methylcyclopentane or cyclohexane to reduce run-away cracking with antimony pentafluoride and at least one fluoroalkane-sulfonic acid of formula $RCF_2SO_3H$ wherein R = Cl, F, $CF_3$, $CF_2Cl$, $CF_3CFCl$, $C_2F_5$, $C_3F_7$, $CF_2SO_3H$, or $C_4F_9$, and
   b. separating the composition of step (a) into a primarily hydrocarbon phase and a phase primarily composed of said acid and said pentafluoride, and
   c. recycling substantially all of said acid and said pentafluoride to step (a), and
   d. intimately contacting said primarily hydrocarbon phase with water to form a purified hydrocarbon phase and an aqueous phase, and
   e. separating said purified hydrocarbon phase from said aqueous phase.

4. The process of claim 3 wherein said fluoroalkanesulfonic acid is trifluoromethanesulfonic acid or perfluoroethanesulfonic acid.

5. The process of claim 4 wherein said light naphtha is composed primarily of substantially dearomatized $C_6$ hydrocarbons.

6. A process for increasing the octane rating of a light naphtha composed primarily of substantially dearomatized $C_6$ hydrocarbons and about 2 to about 30 weight percent of methylcyclopentane or cyclohexane to reduce run-away cracking comprising:
   a. intimately contacting under isomerizing conditions said light naphtha with antimony pentafluoride and at least one fluoroalkanesulfonic acid of formula $CF_3SO_3H$ or $CF_3CF_2SO_3H$; and
   b. subsequently separating said mixture of antimony pentafluoride and at least one fluoroalkanesulfonic acid from the product of step (a).

* * * * *

UNITED STATES PATENT OFFICE
CERTIFICATE OF CORRECTION

Patent No. 4,035,286                Dated July 12, 1977

Inventor(s) David A. Mc Caulay et al.

It is certified that error appears in the above-identified patent and that said Letters Patent are hereby corrected as shown below:

Column 1, line 34, "plurality" should read -- partially --.

Signed and Sealed this

Eighth Day of November 1977

[SEAL]

Attest:

RUTH C. MASON
Attesting Officer

LUTRELLE F. PARKER
Acting Commissioner of Patents and Trademarks